(12) United States Patent
Kayama

(10) Patent No.: US 10,452,860 B2
(45) Date of Patent: Oct. 22, 2019

(54) SYSTEM, ELECTRONIC APPARATUS AND METHOD

(71) Applicant: TOSHIBA CLIENT SOLUTIONS CO., LTD., Koto-Ku, Tokyo (JP)

(72) Inventor: Akemi Kayama, Kunitachi Tokyo (JP)

(73) Assignee: TOSHIBA CLIENT SOLUTIONS CO., LTD., Tokyo (JP)

(*) Notice: Subject to any disclaimer, the term of this patent is extended or adjusted under 35 U.S.C. 154(b) by 230 days.

(21) Appl. No.: 15/345,364

(22) Filed: Nov. 7, 2016

(65) Prior Publication Data

US 2017/0131926 A1  May 11, 2017

Related U.S. Application Data

(60) Provisional application No. 62/253,058, filed on Nov. 9, 2015.

(51) Int. Cl.
G06F 12/00 (2006.01)
G06F 21/62 (2013.01)

(52) U.S. Cl.
CPC .................. *G06F 21/6218* (2013.01)

(58) Field of Classification Search
CPC ................................... G06F 21/6218
See application file for complete search history.

(56) References Cited

U.S. PATENT DOCUMENTS

| | | | |
|---|---|---|---|
| 6,834,333 B2 | 12/2004 | Yoshino et al. | |
| 6,920,567 B1* | 7/2005 | Doherty | G06F 21/10 707/999.104 |
| 7,886,361 B2* | 2/2011 | Kasahara | G06F 12/1416 380/277 |
| 2005/0160236 A1* | 7/2005 | Tierney | G06F 12/0831 711/144 |
| 2009/0083856 A1* | 3/2009 | Aisu | G06F 21/10 726/26 |
| 2009/0216980 A1 | 8/2009 | Asahi et al. | |
| 2014/0285521 A1* | 9/2014 | Kimura | G06F 3/011 345/633 |

FOREIGN PATENT DOCUMENTS

| | | |
|---|---|---|
| JP | 2002-132583 | 5/2002 |
| JP | 2009-205294 | 9/2009 |
| JP | 2012-203699 | 10/2012 |

* cited by examiner

*Primary Examiner* — Prasith Thammavong
(74) *Attorney, Agent, or Firm* — Rutan & Tucker, LLP

(57) ABSTRACT

According to one embodiment, a system includes a first electronic apparatus and a second electronic apparatus. The first electronic apparatus causes an external storage medium to store first information which controls possibility of writing of a file to the external storage medium in units of file. The second electronic apparatus determines possibility of the writing of a requested file to the external storage medium based on the first information, write the requested file to the external storage medium if the requested file is determined to be capable of being written, and prohibit the writing of the requested file to the external storage medium if the requested file is determined to be incapable of being written.

20 Claims, 7 Drawing Sheets

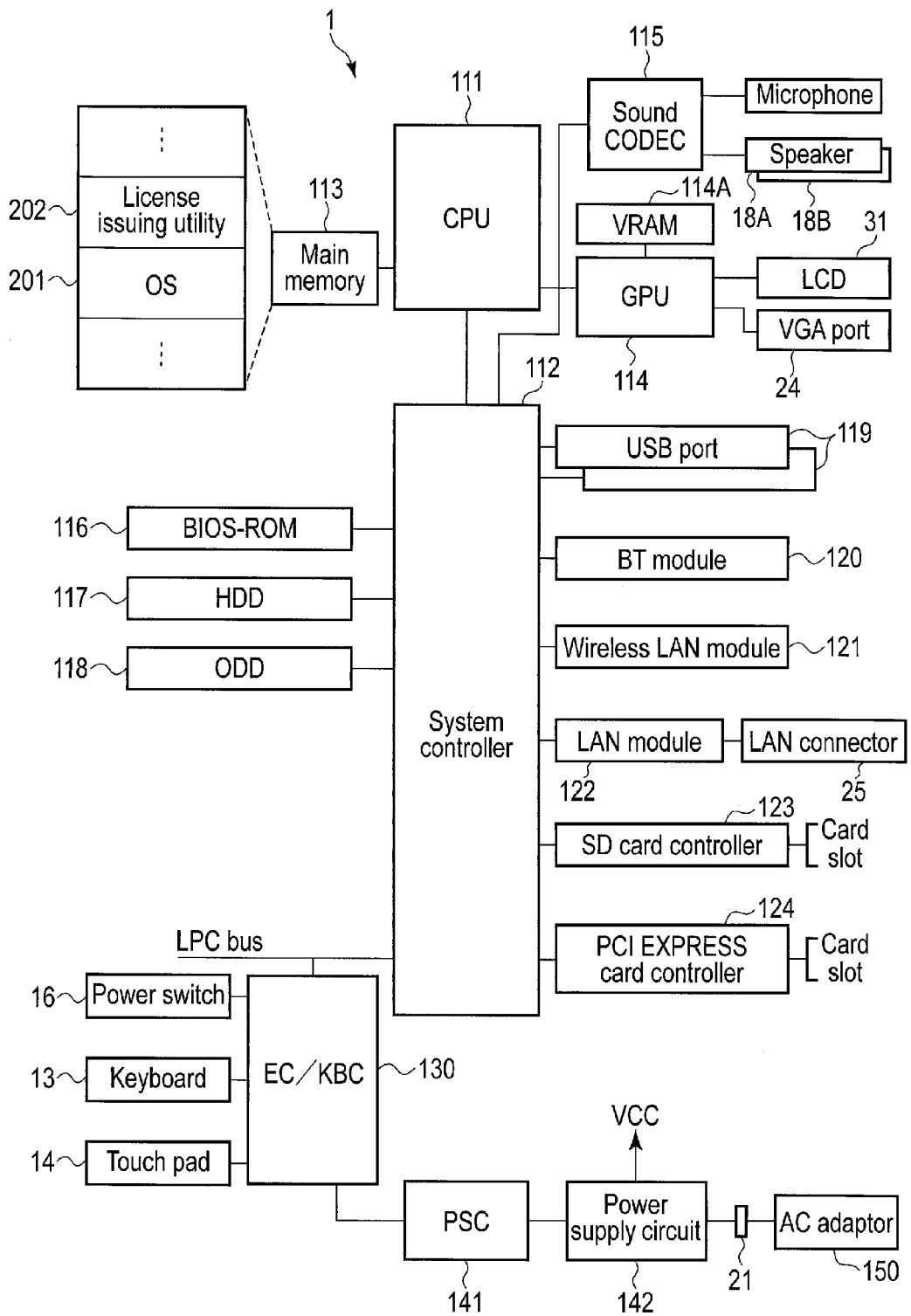
F I G. 3

FIG. 4

| Permission list | | |
|---|---|---|
| ☑ File name: | "Work report" | included ▽ |
| ☐ Extension: | | |
| ☑ Latest date of updating: | Not designated ~ 2015/07/01 12:00 | |
| ☑ Number of files: | 5 or less | |
| ☑ Total file size: | 5 MB ▽ or less | |
| ☑ Size per file: | 1 MB ▽ or less | |

| Exclusion list | | |
|---|---|---|
| ☑ File name: | "HOGE work report" | included ▽ |
| ☑ Extension: | .png | |
| ☑ Latest date of updating: | 2015/02/05 12:00 ~ 2015/02/10 12:00 | |

[ OK ]   [ Cancel ]

| Date and time | 2015/07/09 15:34:08 |
|---|---|
| Operation | Copy |
| Result | Successful |
| Copy source file pass | C:¥Users¥Taro¥Documents¥work report 0709. doc |
| Copy source file size | 32KB |
| Latest date and time of updating of copy source file | 2015/07/09 12:03:24 |
| Copy destination device | USB memory |

F I G. 8

| Date and time | 2015/07/09 15:24:15 |
|---|---|
| Operation | Copy |
| Result | Failed (unpermitted file) |
| Copy source file pass | C:¥Users¥Taro¥Documents¥Screenshot. PNG |
| Copy source file size | 1MB |
| Latest date and time of updating of copy source file | 2015/07/09 09:25:44 |
| Copy destination device | USB memory |

F I G. 9

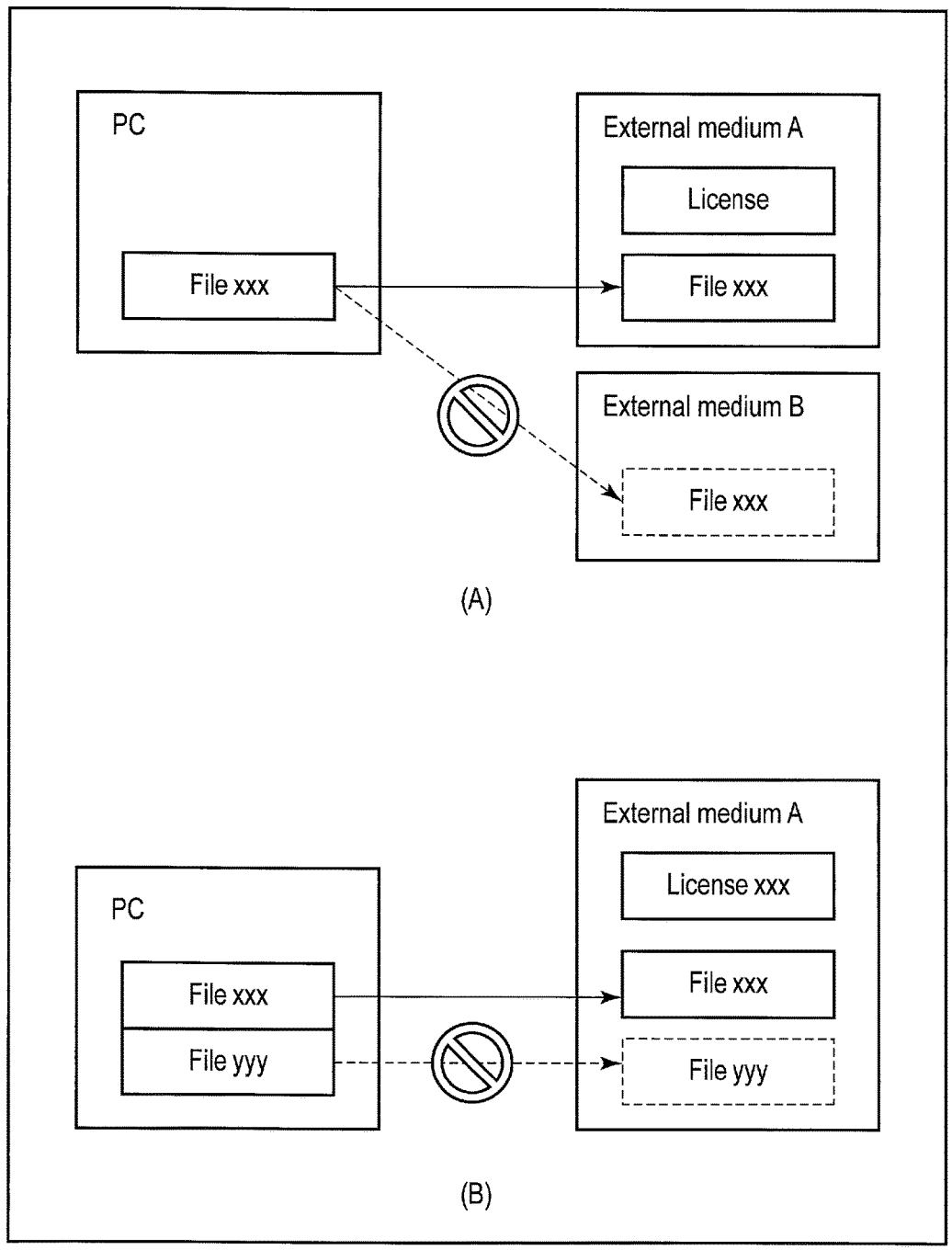
F I G. 10

SYSTEM, ELECTRONIC APPARATUS AND METHOD

CROSS-REFERENCE TO RELATED APPLICATIONS

This application claims the benefit of U.S. Provisional Application No. 62/253,058, filed Nov. 9, 2015, the entire contents of which are incorporated herein by reference.

FIELD

Embodiments described herein relate generally to a system, an electronic apparatus and a method.

BACKGROUND

Recently, for example, employees in companies have conducted business while using electronic apparatuses such as personal computers and, use of external media attachable to and detachable from the electronic apparatuses, such as USB memories and SD cards, have been prohibited by rules to prevent leakage of information.

In addition, software capable of definitely prohibiting writing of files to the external media or capable of recording logs of access to the external media have been developed, and the employees have installed such software in the personal computers used for business.

Definite prohibition of writing of files to the external media may cause troubles in business. In contrast, if the log of access to the external media is recorded, it can be confirmed later what file has been written but the writing of files itself cannot be restricted. Thus, for example, a flexible measure of permitting necessary and least files to be written is required to be taken in relation to the writing of files to the external media.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 3 is an exemplary diagram showing an example of a system configuration of a license issuing server constituting the system of the embodiment.

FIG. 4 is an exemplary illustration showing an example of a setup screen displayed by a license issuing utility program operating in the license issuing server constituting the system of the embodiment.

FIG. 8 is an exemplary illustration showing an example of a log output when the client PC constituting the system of the embodiment is successful in writing the file to the external medium.

FIG. 9 is an exemplary illustration showing an example of a log output when the client PC constituting the system of the embodiment is unsuccessful in writing the file to the external medium.

FIG. 10 is an exemplary illustration showing comparison of restriction of writing of files to an external medium in the system of the embodiment with conventional restriction of writing of files to an external medium.

DETAILED DESCRIPTION

Various embodiments will be described hereinafter with reference to the accompanying drawings.

In general, according to one embodiment, a system includes a first electronic apparatus and a second electronic apparatus. The first electronic apparatus includes a first connector and a first hardware processor. An external storage medium is connectable to the first connector. The first hardware processor is configured to cause the external storage medium to store first information which controls possibility of writing of a file to the external storage medium in units of file. The second electronic apparatus includes a second connector and a second hardware processor. The external storage medium is connectable to the second connector. The second hardware processor is configured to accept a request for writing of the requested file to the external storage medium, determine possibility of the writing of the requested file to the external storage medium based on the first information stored in the external storage medium, write the requested file to the external storage medium if the requested file is determined to be capable of being written, and prohibit the writing of the requested file to the external storage medium if the requested file is determined to be incapable of being written.

Figures 1, 2:
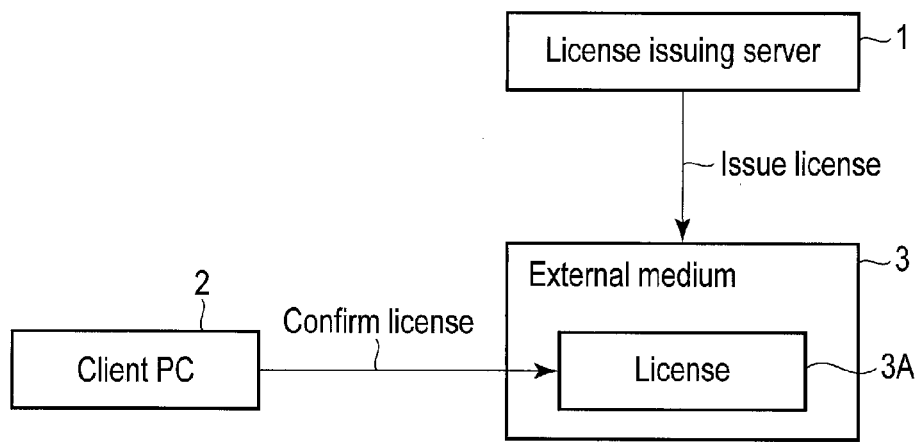
FIG. 1 is an exemplary diagram showing an example of configuration in a system of the embodiment.
FIG. 2 is an exemplary illustration showing a summary of a license issued to an external medium in the system of the embodiment.

FIG. 1 is an exemplary diagram showing an example of configuration in the system of the embodiment. It is assumed here that the system of the embodiment is composed of a license issuing server 1 and a client PC 2 as shown in FIG. 1. The license issuing server 1 is, for example, an electronic apparatus such as a personal computer, which is used by, for example, a system administrator called an administrator or the like. In contrast, the client PC 2 is, for example, an electronic apparatus such as a personal computer, which is, for example, used for business by an employee.

In addition, an external medium 3 shown in FIG. 1 is a storage device attachable to and detachable from the client PC 2, which is supplied to a user (employee) using the client PC 2. It is needless to say that the external medium 3 is also attachable to and detachable from the license issuing server 1. A license 3A is issued (stored) for the external medium 3 by the license issuing server 1 before the external medium 3 is supplied to the user (employee) using the client PC 2. The license 3A is information for restriction which permits writing of a file to the external medium 3 at the client PC 2 only when certain conditions are met. For example, the license 3A is a file having a file name conforming to a predetermined naming rule, and is a hidden file. Software (i.e., a license issuing utility program 202 to be explained later) for issuing the license 3A for the external medium 3 is installed in the license issuing server 1. In contrast, software (i.e., a file write tool 301 and a minifilter driver 302 to be explained later) for prohibiting writing of a file to the external medium 3 by an application program or the like, and for executing writing of a file to the external medium 3 under certain conditions, based on the license 3A stored in the external medium 3, is installed in the client PC 2.

FIG. 2 is an exemplary illustration showing a summary of the license 3A issued to the external medium 3 in the system of the embodiment.

As shown in FIG. 2, the license 3A includes two types of information, i.e., a permission list indicating conditions under which the writing of the file to the external medium 3 is permitted, and an exclusion list indicating conditions of a file which should be excluded from the files satisfying the conditions of the permission list. Detailed contents of the license 3A will be explained later.

FIG. 3 is an exemplary diagram showing an example of a system configuration of a license issuing server constituting the system of the embodiment.

As shown in FIG. 3, the license issuing server 1 comprises a CPU 111, a system controller 112, a main memory 113, a graphics processing unit (GPU) 114, a sound codec 115, a BIOS-ROM 116, a hard disk drive (HDD) 117, an optical disc drive (ODD) 118, a USB port 119, a BT (Bluetooth; registered trademark) module 120, a wireless LAN module 121, a LAN module 122, an SD card controller 123, a PCI Express card controller 124, an embedded controller/keyboard controller IC (EC/KBC) 130, a power supply controller (PSC) 141, a power supply circuit 142, and the like.

The CPU 111 is a processor which controls operations of respective components of the license issuing server 1. The CPU 111 executes various types of software loaded from the HDD 117 into the main memory 113. The software includes an operating system (OS) 201 and the license issuing utility program 202.

In addition, the CPU 111 also executes a basic input/output system (BIOS) stored in the BIOS-ROM 116 which is a nonvolatile memory. The BIOS is a system program for hardware control.

The system controller 112 is a bridge device which makes connection between the CPU 111 and each of the components. A serial ATA controller which controls the HDD 117 and the ODD 118 is built in the system controller 112. In addition, the system controller 112 executes communication with a USB device such as a USB memory connected via the USB port 119. Furthermore, the system controller 112 executes communication with each of the devices on a low PIN count (LPC) bus.

The GPU 114 is a display controller which controls the LCD 31. The GPU 114 generates a display signal (i.e., LVDS signal) which should be supplied to the LCD 31 from display data stored in a video memory (VRAM) 114A. The GPU 114 can also generate an analog RGB signal from the display data. The analog RGB signal is supplied to an external display device via a VGA port 24.

The sound codec 115 is a sound controller which executes audio processing for audio input from a microphone and audio output to a speaker.

The BT module 120 is a communication device which executes wireless communication conforming to the Bluetooth (registered trademark) standard. The wireless communication module 121 is a communication device which executes wireless communication conforming to, for example, IEEE 802.11 standard. The LAN module 122 is a communication device which executes wired communication conforming to, for example, IEEE 802.3 standard.

The SD card controller 123 controls access to an SD card accommodated in a card slot. The PCI Express card controller 124 controls access to a PCI Express card (PCIe card) accommodated in a card slot.

The EC/KBC 130 is a power management controller which executes power management of the license issuing server 1 and is implemented as a single-chip microcomputer in which, for example, a keyboard controller configured to control the keyboard 13, the touch pad 14, and the like is built. The EC/KBC 130 has a function to power on and off the license issuing server 1 in response to a user operation of the power switch 16. The control to power on and off the license issuing server 1 is executed by a collaborative operation of the EC/KBC 130 and the PSC 141. When the PSC 141 receives an ON signal sent from the EC/KBC 130, the PSC 141 controls the power supply circuit 142 to power on the license issuing server 1. In addition, when the PSC 141 receives an OFF signal sent from the EC/KBC 130, the PSC 141 controls the power supply circuit 142 to power off the license issuing server 1. The EC/KBC 130, the PSC 141 and the power supply circuit 142 also operate with the electric power from an AC adapter 150 over a period in which the license issuing server 1 is powered off.

The power supply circuit 142 generates the electric power (operational power supply) which should be supplied to each of the components, by using the electric power from the AC adapter 150.

Next, the license issuing utility program 202 operating in the license issuing server 1 having the above-explained system configuration will be explained with reference to FIG. 4. FIG. 4 is an exemplary illustration showing an example of a setup screen (of the license 3A) displayed by the license issuing utility program 202.

It is assumed here that the external medium 3 is a USB memory. Besides the USB memory, any storage device attachable to and detachable from the license issuing server 1 and the client PC 2, such as an SD card or a PCIe card, can be applied as the external medium 3. The user (system administrator) of the license issuing server 1 connects the USB memory serving as the external medium 3 to the USB port 119 and activates the license issuing utility program 202. The license issuing utility program 202 activated by the system administrator includes instructions for displaying the setup screen shown in FIG. 4.

As shown in FIG. 4, the setup screen is roughly divided into a permission list input field and an exclusion list input field.

In the permission list input field, input areas are set for items "file name", "extension", "latest date of updating", "number of files", "total file size" and "size per file", respectively. In addition, in the input area of each item, a button area to designate application of the item is set together. Input to the input area of the item is permitted by setting the button to be on. It should be noted that other items may be included in the permission list input field.

The "file name" is a name of a file permitted to be written to the external medium 3. As regards the file name, partial match or perfect match can be selected. The "extension" is an extension, i.e., a type of a file permitted to be written to the external medium 3. The "latest date of updating" is information indicating a timely range to control the permission of write to the external medium 3 by the latest date of updating, or a period in which at least any one of the start time and the end time (of permitted write to the external medium 3) is set.

The "number of files" is the number of files permitted to be written to the external medium 3. The "total file size" is a total file size of files permitted to be written to the external medium 3. The "size per file" is the size of a file permitted to be written to the external medium 3. Each item of the permission list is applied as an AND condition.

In contrast, in the exclusion list input field, input areas are set for items "file name", "extension", and "latest date of updating", respectively. In addition, in the input field of each item, a button area to designate application of the item is set together. Input to the input area of the item is permitted by setting the button to be on. It should be noted that other items may be included in the exclusion list input field.

The "file name" is a name of a file restricted to be written to the external medium 3. As regards the file name, partial match or perfect match can be selected. The "extension" is an extension, i.e., a type of a file restricted to be written to the external medium 3. The "latest date of updating" is information indicating a timely range to control the permission of write to the external medium 3 by the latest date of updating, or a period in which at least any one of the start time and the end time (of restricted write to the external medium 3) is set. Each item of the permission list is applied as an OR condition.

In the case of FIG. 4, for example, a file having "work report" included in its file name but having "HOGE work report" included in its file name is restricted to be written to the external medium 3. Similarly, a file having the "latest date of updating" before 2015/07/01 12:00 but having "latest date of updating" after 2015/02/05 12:00 until 2015/02/12 12:00 is restricted to be written to the external medium 3.

The license issuing utility program 202 includes instructions for saving the license 3A including set contents on the setup screen, in the USB memory (external medium 3) connected to the USB port 119. As explained above, the license 3A is stored in the external medium 3 as a hidden file having the file name conforming to a predetermined naming rule. The license issuing utility program 202 includes instructions for reading the contents of the license 3A and for displaying the contents on the setup screen to be displayed if the license 3A has already been present in the external medium 3, at the activation. In other words, the user (system administrator) of the license issuing server 1 can add a change to the issued license 3A by the license issuing utility program 202.

Next, a file write tool 301 and a minifilter driver 302 operating in the client PC 2 will be explained with reference to FIG. 5. The system configuration of the client PC 2 is substantially the same as the license issuing server 1, and its explanation is omitted here.

Figures 5, 6:
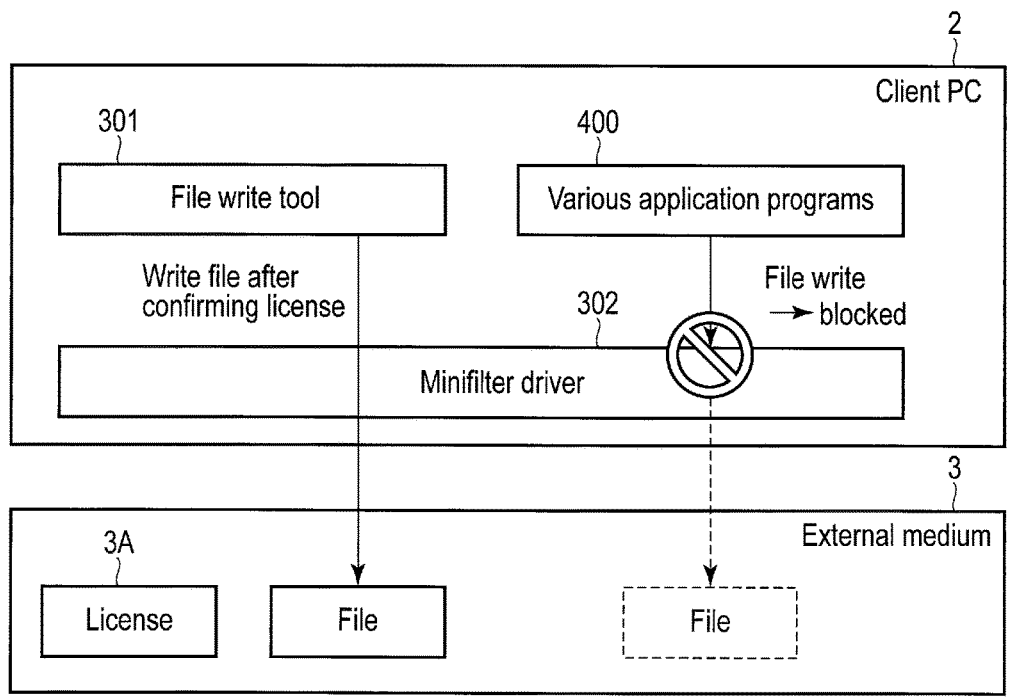
FIG. 5 is an exemplary diagram for explanation of a file write tool and a minifilter driver operating in a client PC constituting the system of the embodiment.
FIG. 6 is an exemplary illustration showing an example of a GUI provided by the client PC constituting the system of the embodiment.

As shown in FIG. 5, the file write tool 301 and the minifilter driver 302 are installed in the client PC 2, and at least the minifilter driver 302 is incorporated in the client PC 2 as a resident program.

The minifilter driver 302 is, for example, a module for prohibiting writing of a file to the external medium 3 by various application programs 400. As the method of prohibiting the writing of a file to the external medium 3, for example, various methods such as receiving the request for the writing of a file to the external medium 3 issued by the various application programs 400 by the minifilter driver 302 instead of the OS and sending a response indicating write failure to the various application programs 400, and the like can be employed. It should be noted that read of a file from the external medium 3 or writing of a file to, for example, a built-in medium such as an HDD is not prohibited by the minifilter driver 302.

The file write tool 301 is a module for executing writing of a file to the external medium 3 which is prohibited by the minifilter driver 302 under certain conditions, i.e., in a case where the conditions represented by the license 3A are met. The file write tool 301 includes instructions for providing the user of the client PC 2 with a GUI (screen) for writing a file to the external medium 3 as shown in, for example, FIG. 6. In other words, the writing of a file to the external medium 3 becomes capable by the file write tool 301 alone, in the client PC 2 of the embodiment. In addition, the file write tool 301 includes instructions for encrypting a file which is to be written to the external medium 3 and instructions for setting a password on a file which is to be written to the external medium 3.

Figure 7:
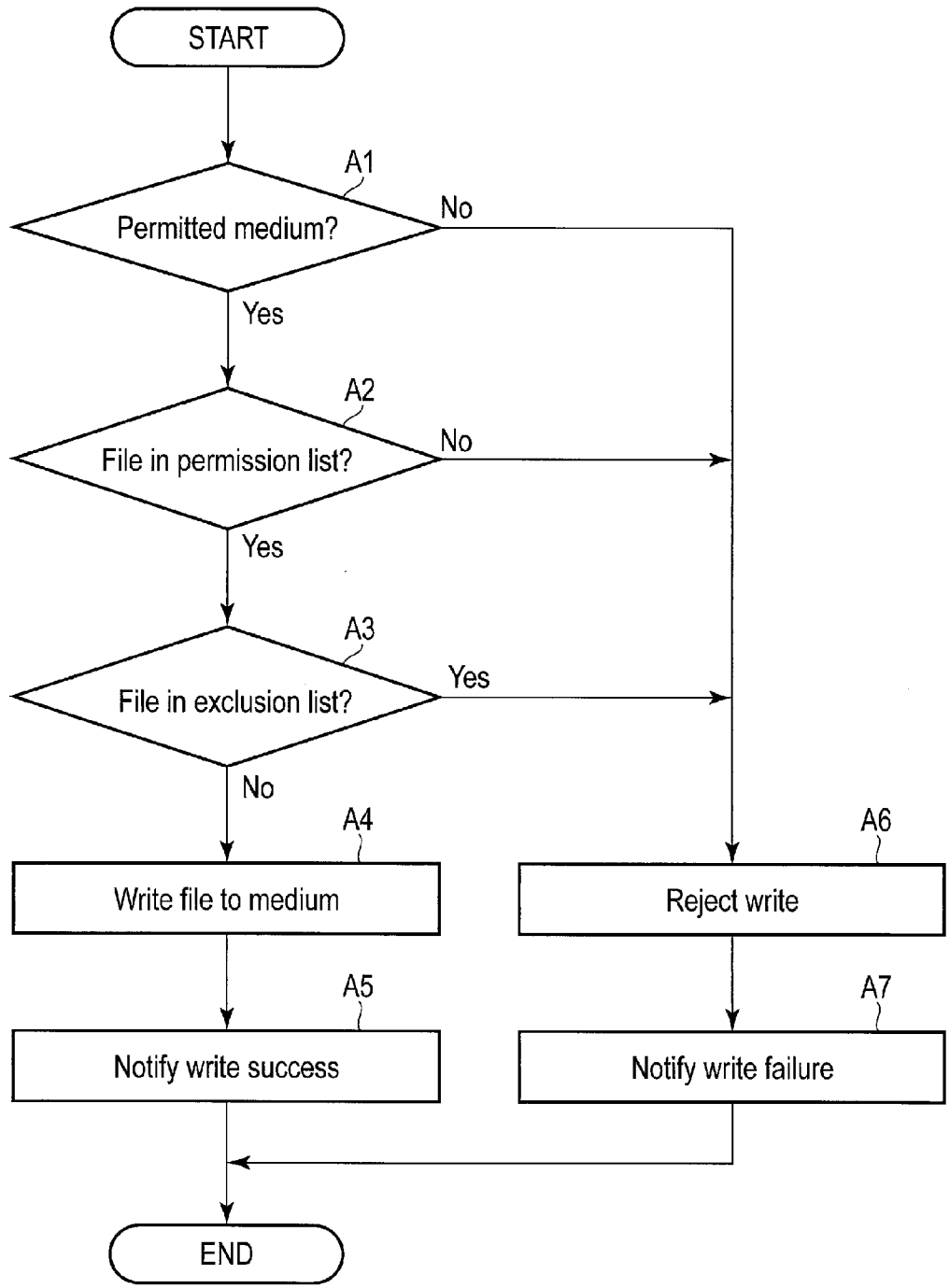
FIG. 7 is an exemplary flowchart showing an example of procedures of write processing of a file to an external medium by the client PC constituting the system of the embodiment.

As shown in FIG. 6, an input area to designate a file which is an output target to the external medium 3 and an input area to designate a drive name assigned to an output destination, i.e., the external medium 3 are set in the screen displayed by the file write tool 301. If a folder is designated as an output target to the external medium 3, all files in the folder can be designated as output targets to the external medium 3. More specifically, the user can write only files meeting the conditions represented by the license 3A, of all the files in the folder, to the external medium 3 by one operation. In addition, a folder name can be designated subsequently with the drive name, as the output destination. Furthermore, an input area for a password which is to be set on a file written to the external medium 3 is set on the screen. If a "run" button arranged on the screen is operated, the processing of writing a file to the external medium 3 is executed by, for example, steps shown in FIG. 7. More specifically, the file write tool 301 includes instructions for executing the processing of writing a file to the external medium 3 by, for example, steps shown in FIG. 7. The modes of writing a file to the external medium 3 are copy which leaves the source file and move which erases the source file, and selection of copy or move may be executed on the screen of FIG. 6 or screens for copy and move may be provided separately. Alternatively, either copy or move may be selected fixedly as system specifications.

First, whether the external medium 3 designated as an output destination is an external medium permitted to write a file or not is determined (block A1). This determination can be executed based on, for example, whether the license 3A is stored in the external medium 3 or not. If the external medium 3 is an external medium permitted to write a file (YES in block A1), whether a file designated as an output target is included in the permission list or not is determined (block A2). More specifically, whether the file meets the conditions for permission list or not is determined. For example, if a folder is designated as an output target and plural files meeting the conditions of the file name, the latest date of updating and the like are present in this folder, the number of files and the total file size are also determined.

If the file meets the conditions for permission list (YES in block A2), whether the file designated as the output target or the file meeting the conditions for permission list, of the files in the folder in a case where the folder is designated, is included in the exclusion list is determined (block A3). More specifically, whether the file meets the conditions for exclusion list or not is determined.

If the file does not meet the conditions for exclusion list (NO in block A3), the file designated as the output target or the file meeting the conditions for permission list, of the files in the folder in a case where the folder is designated is written to the external medium 3 designated as the output destination (block A4). Then, it is notified to the user of the client PC 2 that writing of the file to the external medium 3 has been successful (block A5).

In contrast, if any one of cases that (a) the external medium 3 is not an external medium permitted to write a file (NO in block A1), (b) the file does not meet the conditions for permission (NO in block A2) and (c) the file meets the conditions for exclusion list (YES in block A3), is applied, the writing of the file to the external medium 3 is rejected (block A6). Then, it is notified to the user of the client PC 2 that the writing of the file to the external medium 3 has failed (block A7).

In addition, success/failure in writing of the file is output to the external medium 3 as a log to a built-in medium such as an HDD of the client PC 2. The output destination of the log may be the external medium 3. Alternatively, the license issuing server 1 and the client PC 2 may be connected over a network such that the log can be transmitted from the client PC 2 to the license issuing server 1 instantaneously or periodically.

FIG. 8 is an exemplary illustration showing an example of a log output when the writing of the file to the external medium 3 has been successful, and FIG. 9 is an illustration showing an example of a log output when the writing of the file to the external medium 3 has failed.

As shown in FIG. 8 and FIG. 9, information such as "date and time", "operation", "result", "copy source file pass", "copy source file size", "latest date and time of updating of copy source file", "copy destination device" and the like is included in the log output from the file write tool 301. If the writing of the file to the external medium 3 is failed, the reason that, for example, the file name does not meet the conditions for permission list, or the like is also recorded in the "result" field. The system administrator can track an action of writing the file to the external medium 3 by the user (employee) using the client PC 2, by checking the log.

FIG. 10 is an exemplary illustration showing comparison of restriction of writing of files to the external medium in the system of the embodiment with conventional restriction of writing of files to an external medium.

As shown in FIG. 10(A), permission to write a file to a specific external medium alone, i.e., restriction in unit of an external medium has been conventionally executed. This method cannot reduce a risk in information leakage through a specific external medium permitted to write the file. In contrast, the system of the embodiment can execute not only the restriction in unit of the external medium 3 (based on issue of the license 3A), but also the restriction in unit of file as shown in FIG. 10(B).

Thus, according to the system of the embodiment, for example, a flexible measure of permitting necessary and least files to be written is implemented in relation to the writing of files to the external media.

Various functions disclosed in the embodiment may also be each realized by a processing circuit. Examples of the processing circuit include a programmed processor such as a central processing unit (CPU). The processor executes each of the disclosed functions by executing a program stored in a memory. The processor may be a microprocessor comprising an electric circuit. The examples of the processing circuit also include a digital signal processor (DSP), an application specific integrated circuit (ASIC), a microcontroller, a controller, and other electric circuit components.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A system comprising:
a first electronic apparatus that sets writing license information for an external storage medium; and
a second electronic apparatus that executes writing of files to the external storage medium required from various application programs, wherein
the first electronic apparatus comprises
a utility program configured to set the writing license information including permission list information and permission exclusion list information, and store the writing license information to the external storage medium,
the second electronic apparatus comprises
a filter driver configured to receive a request for writing of a file to the external storage medium from the various application programs instead of an Operating System (OS), and
a writing tool configured to write, when
a request for writing of a file to the external storage medium is received by the filter driver and when it is determined that the writing license information is stored in the external storage medium,
only a file which meets a setting condition of the permission list information and which does not meet a setting condition of the permission exclusion list information to the external storage medium.

2. The system of claim 1, wherein:
the permission list information indicates a condition under which the writing of the file to the external storage medium is permitted, and the permission exclusion list information indicates a condition of a file which should be excluded from files meeting the permission list information.

3. The system of claim 2, wherein:
the permission list information comprises a file name, an extension, a latest date and time of updating, number of files and a total file size; and
the permission exclusion list information comprises a file name, an extension and a latest date and time of updating.

4. The system of claim 1, wherein the filter driver is installed in the second electronic apparatus as a resident program.

5. The system of claim 1, wherein the writing tool is configured to provide a GUI screen on a screen of the second electronic apparatus for writing of the file to the external storage medium.

6. The system of claim 5, wherein the GUI screen includes an input area to designate a file which is an output target to the external storage medium, and an input area to designate a driver name assigned to the external storage medium.

7. The system of claim 6, wherein upon designating a folder as an output target to the external storage medium, files of all the files in the folder, which meet the setting condition of the permission list information and which do not meet a setting condition of the permission exclusion list information, are written to the external storage medium.

8. The system of claim 5, wherein the writing tool further comprises a function for encrypting a file which is to be written to the external storage medium, and a function for setting a password on a file which is to be written to the external storage medium.

9. An electronic apparatus comprising:
a connector in which an external storage medium is connectable, the external storage medium setting writing license information including permission list information and permission exclusion list information;
a filter driver configured to receive a request for writing of a file to the external storage medium from various application programs instead of an Operating System (OS), and
a writing tool configured to write, when
a request for writing of a file to the external storage medium is received by the filter driver and when it is determined that the writing license information is stored in the external storage medium,
only a file which meets a setting condition of the permission list information and which does not meet a setting condition of the permission exclusion list information to the external storage medium.

10. The electronic apparatus of claim 9, wherein the filter driver is installed as a resident program.

11. The electronic apparatus of claim 9, wherein:
the permission list information indicates a condition under which the writing of the file to the external storage medium is permitted, and the permission exclusion list information indicates a condition of a file which should be excluded from files meeting the permission list information.

12. The electronic apparatus of claim 11, wherein:
the permission list information comprises a file name, an extension, a latest date and time of updating, number of files and a total file size; and
the permission exclusion list information comprises a file name, an extension and a latest date and time of updating.

13. The electronic apparatus of claim 9, wherein the writing tool is configured to provide a GUI screen on a screen for writing of the file to the external storage medium.

14. The electronic apparatus of claim 13, wherein the GUI screen includes an input area to designate a file which is an output target to the external storage medium, and an input area to designate a driver name assigned to the external storage medium.

15. The electronic apparatus of claim 14, wherein upon designating a folder as an output target to the external storage medium, files of all the files in the folder, which meet the setting condition of the permission list information and which do not meet a setting condition of the permission exclusion list information, are written to the external storage medium.

16. The electronic apparatus of claim 13, wherein the writing tool further comprises a function for encrypting a file which is to be written to the external storage medium, and a function for setting a password on a file which is to be written to the external storage medium.

17. A method executed by a system configured by a first electronic apparatus and a second electronic apparatus, the first electronic apparatus setting writing license information for an external storage medium, the second electronic apparatus executing writing of files to the external storage medium required from various application programs, the method comprising:
setting, by a utility program of the first electronic apparatus, the writing license information including permission list information and permission exclusion list information, and storing the writing license information to the external storage medium;
receiving, by a filter driver resident in the second electronic apparatus, a request for writing of a file to the external storage medium from the various application programs instead of an Operating System (OS);
determining, by a writing tool of the second electronic apparatus, whether or not the writing license information is stored in the external storage medium; and
when a request for writing of a file to the external storage medium is received by the filter driver and when it is determined that the writing license information is stored in the external storage medium, writing, by the writing tool, only a file which meets a setting condition of the permission list information and which does not meet a setting condition of the permission exclusion list information to the external storage medium.

18. The method of claim 17, wherein:
the permission list information indicates a condition under which the writing of the file to the external storage medium is permitted, and the permission exclusion list information indicates a condition of a file which should be excluded from files meeting the permission list information.

19. The method of claim 18, wherein:
the permission list information comprises a file name, an extension, a latest date and time of updating, number of files and a total file size; and
the permission exclusion list information comprises a file name, an extension and a latest date and time of updating.

20. The method of claim 17, wherein upon designating a folder as an output target to the external storage medium, files of all the files in the folder, which meet the setting condition of the permission list information and which do not meet a setting condition of the permission exclusion list information, are written to the external storage medium.

* * * * *